(12) United States Patent
Kehr

(10) Patent No.: US 11,377,178 B2
(45) Date of Patent: Jul. 5, 2022

(54) WAVE SHELTERING MONOHULL VESSEL

(71) Applicant: Young-Zehr Kehr, Keelung (TW)

(72) Inventor: Young-Zehr Kehr, Keelung (TW)

(73) Assignee: National Taiwan Ocean University, Keelung (TW)

( * ) Notice: Subject to any disclaimer, the term of this patent is extended or adjusted under 35 U.S.C. 154(b) by 111 days.

(21) Appl. No.: 16/703,882

(22) Filed: Dec. 5, 2019

(65) Prior Publication Data

US 2020/0317307 A1 Oct. 8, 2020

(30) Foreign Application Priority Data

Apr. 2, 2019 (TW) ................. 108111722

(51) Int. Cl.
| | |
|---|---|
| *B63B 39/02* | (2006.01) |
| *B63B 21/50* | (2006.01) |
| *B63H 5/125* | (2006.01) |
| *B63B 35/44* | (2006.01) |
| *B63B 39/00* | (2006.01) |

(52) U.S. Cl.
CPC .............. *B63B 35/44* (2013.01); *B63B 21/50* (2013.01); *B63B 39/00* (2013.01); *B63B 39/02* (2013.01); *B63H 5/125* (2013.01)

(58) Field of Classification Search
CPC ... B63B 2001/044; B63B 1/048; B63B 21/50; B63B 35/44; B63B 2035/4426; B63B 2035/4433; B63B 2035/4473; B63B 2035/448; B63B 2035/4486; B63B 2035/4493; B63B 35/50; B63B 35/53; B63B 39/02; B63H 5/125; B63H 5/1252; B63H 2005/1254; B63H 2005/1258;
(Continued)

(56) References Cited

U.S. PATENT DOCUMENTS 3,872,814 A * 3/1975 Rodriguez .............. B63B 1/107
114/40
3,886,882 A * 6/1975 Thornburg .............. B63B 35/10
114/40
(Continued)

FOREIGN PATENT DOCUMENTS

| CN | 208559704 | 3/2019 |
|---|---|---|
| JP | S5854113 | 3/1983 |

(Continued)

OTHER PUBLICATIONS

"Search Report of Europe Counterpart Application", dated Aug. 18, 2020, p. 1-p. 7.
(Continued)

*Primary Examiner* — Ajay Vasudeva
(74) *Attorney, Agent, or Firm* — JCIPRNET

(57) ABSTRACT

The disclosure provides a wave sheltering vessel used to reduce the significant wave height of waves. The wave sheltering vessel includes a hull, a plurality of anchors, and a propeller system. A length of the hull is greater than or equal to 60 meters. A ratio of the length to a design draft of the hull is less than or equal to 6.5. A ratio of the length to a breadth of the hull is less than or equal to 3.5. A ratio of the breadth to the design draft of the hull is less than or equal to 2.3. The anchors are installed at the hull along a longitudinal direction of the hull. The propeller system is disposed at the hull.

6 Claims, 20 Drawing Sheets

(58) Field of Classification Search
CPC ......... B63H 25/42; E02B 3/062; E02B 3/064; Y02A 10/11
See application file for complete search history.

(56) References Cited

U.S. PATENT DOCUMENTS

| | | | | |
|---|---|---|---|---|
| 4,012,919 A | * | 3/1977 | Rosa | G05D 1/0206 405/166 |
| 4,531,471 A | * | 7/1985 | Hunsucker | B63B 21/50 114/293 |
| 4,753,185 A | * | 6/1988 | Salusbury-Hughes | B63B 1/107 114/125 |
| 5,823,715 A | * | 10/1998 | Murdoch | E02B 3/064 405/219 |
| 6,257,165 B1 | * | 7/2001 | Danos, Jr. | B63B 3/48 114/265 |
| 6,655,312 B1 | * | 12/2003 | Pollack | B63B 21/50 114/293 |
| 7,658,159 B2 | * | 2/2010 | Kamsvag | B63B 39/06 114/61.27 |
| 10,953,963 B2 | * | 3/2021 | Syvertsen | B63B 39/06 |

FOREIGN PATENT DOCUMENTS

| | | | | |
|---|---|---|---|---|
| JP | H09302640 | | 11/1997 | |
| JP | 2017114264 A | * | 6/2017 | |
| KR | 20120136135 A | * | 12/2012 | ............... B63B 1/08 |
| WO | 2016055965 | | 4/2016 | |

OTHER PUBLICATIONS

"Office Action of Taiwan Related Application No. 108141102", dated Nov. 5, 2020, pp. 1-5.
Chun-Yan Ji et al., "Experimental study of a new type of floating breakwater," Ocean Engineering, vol. 105, Sep. 2015, pp. 295-303.

* cited by examiner

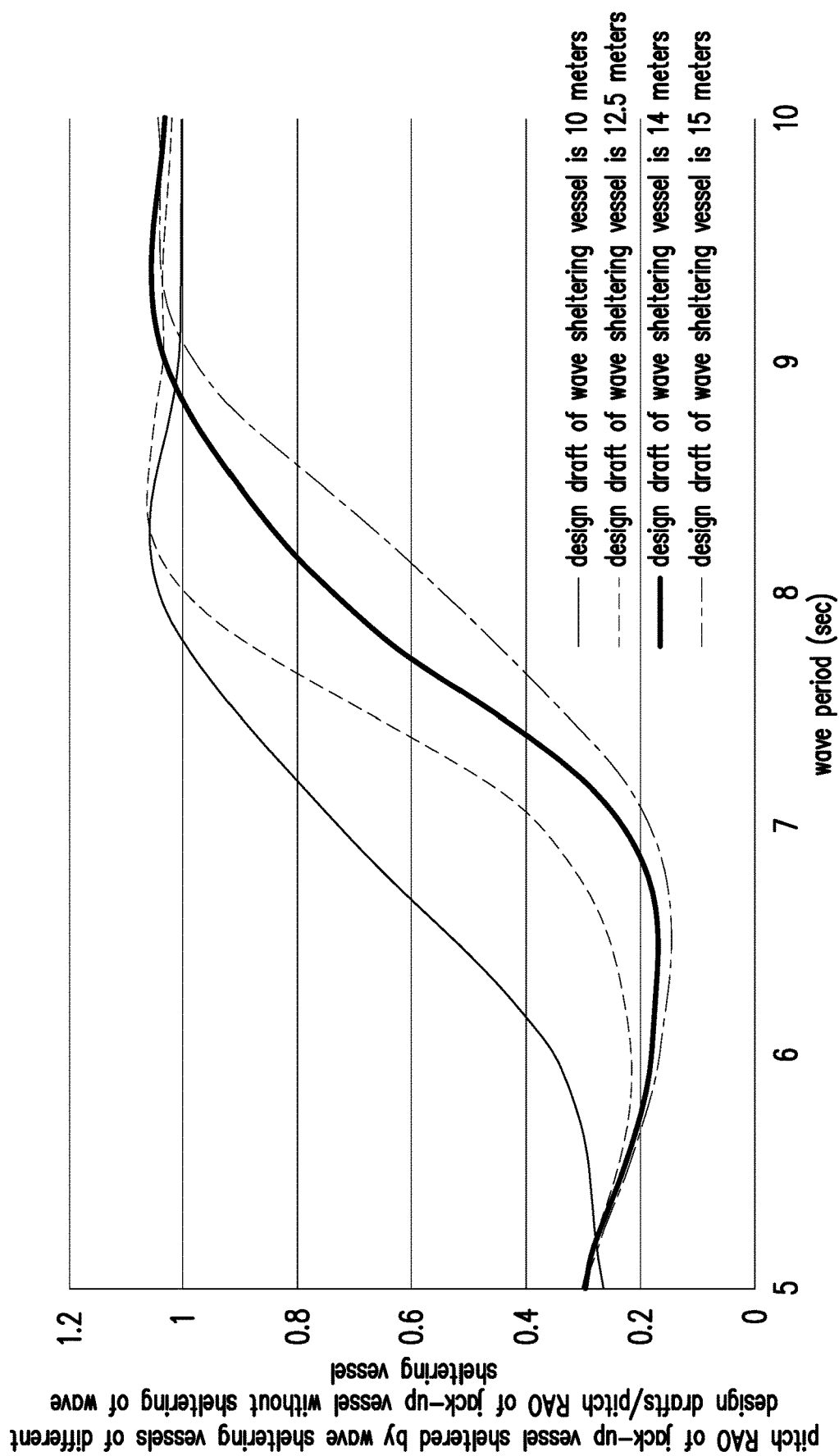

FIG. 10B

[Graph: heave RAO of wave sheltering vessel per unit wave height (m/m) vs wave period (sec), showing curves for design draft of vessel is 15 meters (dashed) and design draft of vessel is 10 meters (solid)]

WAVE SHELTERING MONOHULL VESSEL

CROSS-REFERENCE TO RELATED APPLICATION

This application claims the priority benefit of Taiwan application serial no. 108111722, filed on Apr. 2, 2019. The entirety of the above-mentioned patent application is hereby incorporated by reference herein and made a part of this specification.

BACKGROUND

Technical Field

The disclosure relates to a vessel, and more particularly to a wave sheltering vessel.

Description of Related Art

Today, during the installation process of offshore wind farm, a jack-up vessel or a heavy lift vessel is required regardless of whether it is an offshore foundation installation or wind turbine lifting. However, the two types of vessels are subjected to limitations of the sea condition during offshore operation. Specifically, for the jack-up vessel, when the four feet of the jack-up vessel are to be lowered to the seabed and stand up, if the significant wave height of waves exceeds 1.5 meters, the vessel motion response may be too large and will damage the jack-up system, which will cause the jack-up vessel to be unable to operate. As for the heavy lift vessel, in order to prevent the vessel from being unable to be fixed and installed when lifting heavy objects, the heavy lift vessel is even more restrictive regarding the limitations of the significant wave height.

Facing the above situation, there are two types of solutions at the moment. The first method is to build a larger vessel with a stronger structure to withstand higher waves. However, the disadvantages of the method are that the cost of manufacturing a larger vessel with a stronger structure is very high and the operation time cannot be significantly increased, rendering the method as ineffective. The second method is the method being widely used at the moment, which is to proceed with the installation only when the weather is good and the sea condition allows. If this method is adopted, taking Taiwan as an example, the west coast is the main offshore wind farm construction area in Taiwan, but the area has a significant wave height of less than 1.5 meters for only about half a year of time in one year. Moreover, the cost of manufacturing one jack-up vessel is about EUR 100 million and more. If the jack-up vessel can only operate for half a year every year, plus the cost of installation staff, it is not only inefficient but also non-profitable. In addition, similar problems also exist in Europe.

In general, the common method for assessing the ship motion of a vessel responding to wave is to evaluate using the response amplitude operator (RAO). In detail, the pitch RAO represents the amount of longitudinal pitching motion of the vessel per unit wave height, and the unit thereof is degrees/meter. The heave RAO represents the amount of up and down heave movement for the center of gravity position of the vessel per unit wave height, and the unit thereof is meter/meter (wave height). The arithmetic expressions of the two above are as follows (H is the wave height):

Pitch RAO=amplitude of pitch/$H$

Heave RAO=amplitude of heave/$H$

SUMMARY

The disclosure provides a wave sheltering vessel with a specific ratio between the length, the breadth, and the design draft of a hull thereof. The wave sheltering vessel may effectively reduce the significant wave height of waves at the lee side thereof.

The wave sheltering vessel of the disclosure is used to reduce the significant wave height of waves. The wave sheltering vessel includes a hull, a plurality of anchors, and a propeller system. A length of the hull is greater than or equal to 60 meters. The ratio of the length of the hull to a design draft of the hull is less than or equal to 6.5. The ratio of the length of the hull to a breadth of the hull is less than or equal to 3.5. The ratio of the breadth of the hull to the design draft of the hull is less than or equal to 2.3. The anchors are installed at the hull along a longitudinal direction of the hull. The propeller system is disposed at the hull.

In an embodiment of the disclosure, the number of the anchors is three, and the anchors are respectively disposed at a bow, a stern, and a midship of the hull.

In an embodiment of the disclosure, the propeller system includes two steerable propellers respectively disposed at a bow and a stern of the hull.

In an embodiment of the disclosure, the steerable propellers may be rotated 360 degrees.

In an embodiment of the disclosure, the design draft of the hull is at least 11 meters.

In an embodiment of the disclosure, the hull has a plurality of cabins.

In an embodiment of the disclosure, the anchors are self-supporting anchors.

In an embodiment of the disclosure, the length of the hull is less than or equal to 110 meters.

Based on the above, in the wave sheltering vessel of the disclosure, the specific ratio between the length, the breadth, and the design draft of the vessel, in conjunction with the anchors and the propeller system, may effectively reduce the wave height of waves at the lee side of the wave sheltering vessel and facilitate moving of the vessel.

To make the aforementioned and other features of the disclosure more comprehensible, several embodiments accompanied with drawings are described in detail as follows.

BRIEF DESCRIPTION OF THE DRAWINGS

FIG. 5A is a diagram showing the pitch response of a jack-up vessel under sheltering effects of wave sheltering vessels of different design drafts at different incoming wave periods.

FIG. 10B is a diagram showing the up and down heave response of wave sheltering vessels of different design drafts at different incoming wave periods at a wave direction of 30 degrees.

DETAILED DESCRIPTION OF DISCLOSED EMBODIMENTS

Figure 1:
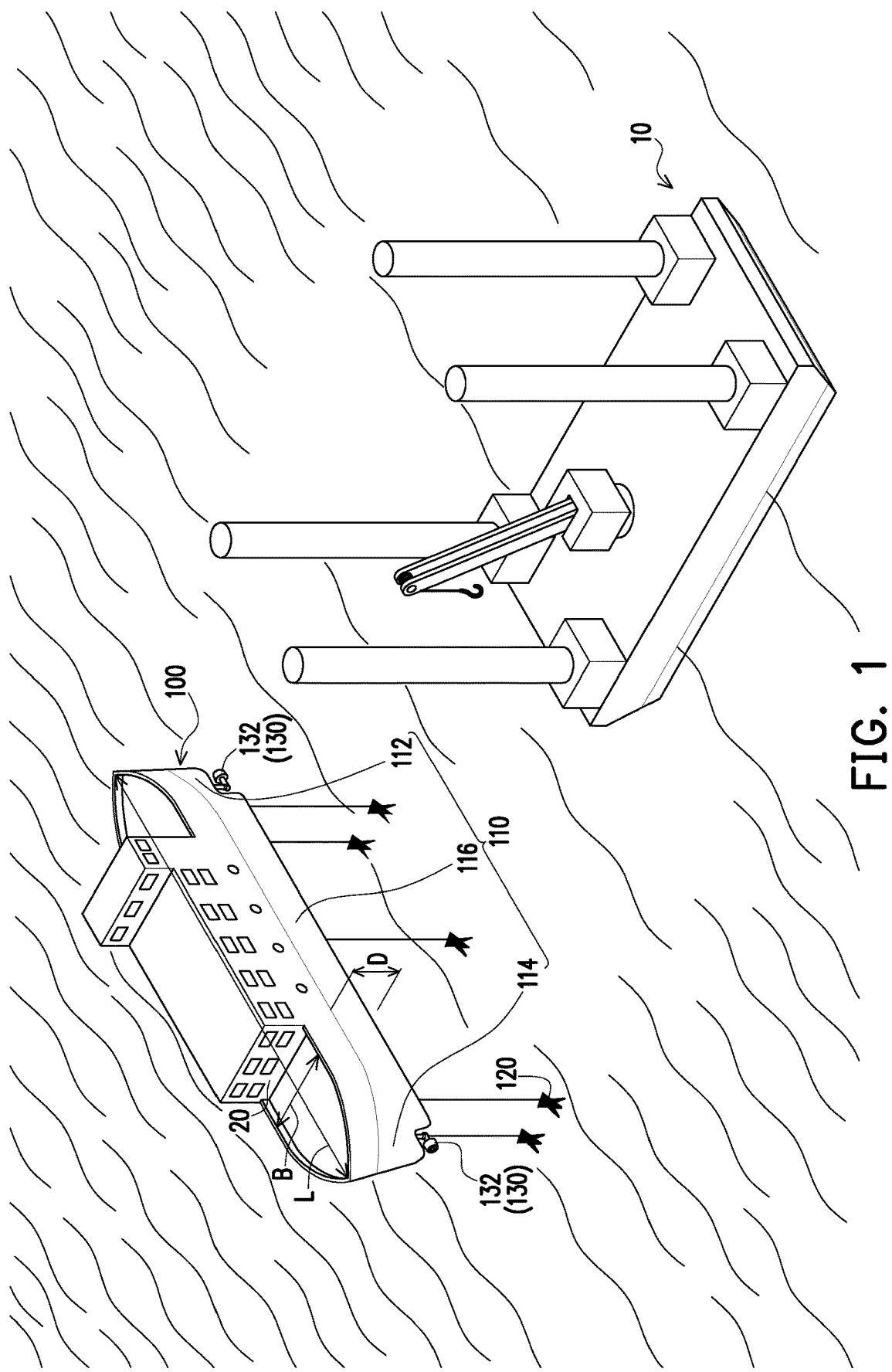
FIG. 1 is a perspective view of a wave sheltering vessel and a conventional wind power installation vessel operating offshore in accordance with an embodiment of the disclosure.

FIG. 1 is a perspective view of a wave sheltering vessel and a conventional wind power installation vessel operating offshore in accordance with an embodiment of the disclosure. Please refer to FIG. 1, currently, during the offshore foundation installation process of offshore wind farm, a jack-up vessel or a heavy lift vessel is required. Moreover, no matter which type of installation vessel is used, the vessel can only be operated under the condition of which the significant wave height is within 1.5 meters. Therefore, in the embodiment, a wave sheltering vessel 100 is disposed at an upwave side of an installation vessel 10. The significant wave height of waves at the lee side thereof is reduced using the sheltering effect of the wave sheltering vessel 100, so as to reduce the magnitude of waves at the lee side and the ship motion response of the installation vessel 10 in the waves to a state of which the installation vessel 10 is able to operate, thereby significantly increasing the time during which the installation vessel 10 is able to operate offshore. The installation vessel 10 illustrated in FIG. 1 is exemplified using a jack-up vessel, but disclosure is not limited herein.

Figure 2:
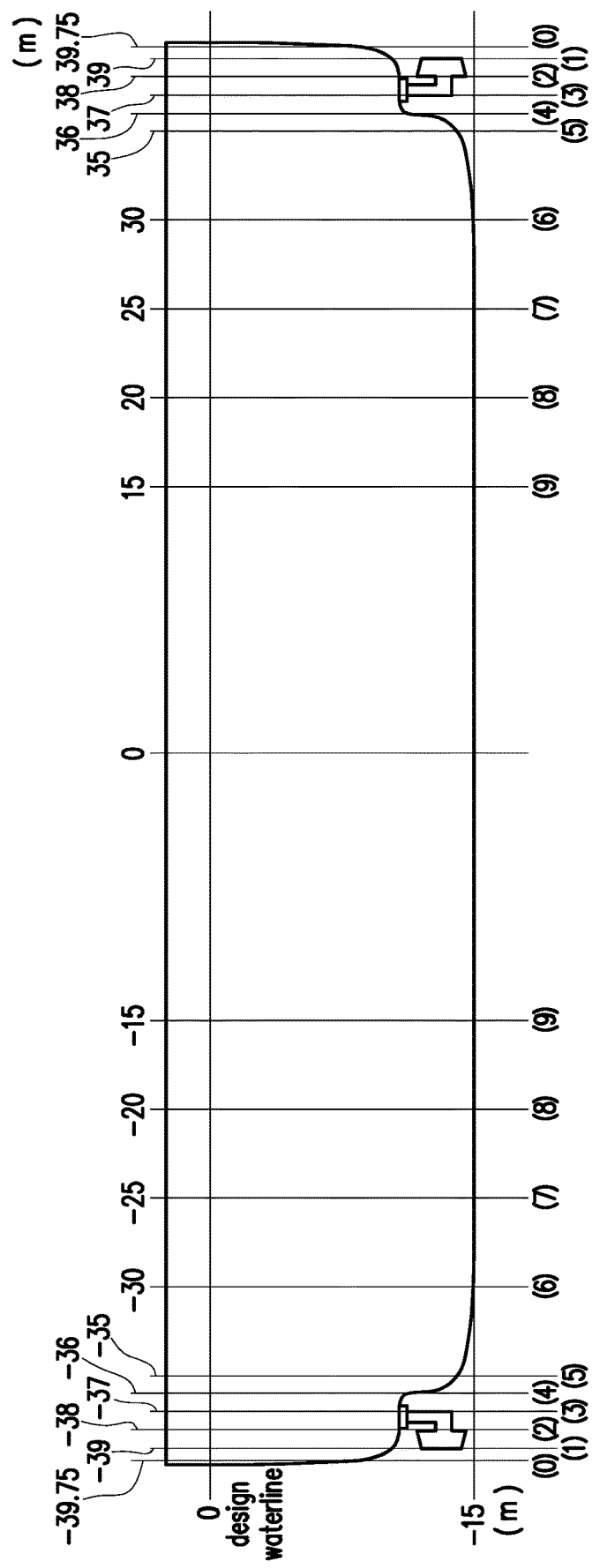
FIG. 2 is a partial side view of a hull of the wave sheltering vessel of FIG. 1.
Figure 3:
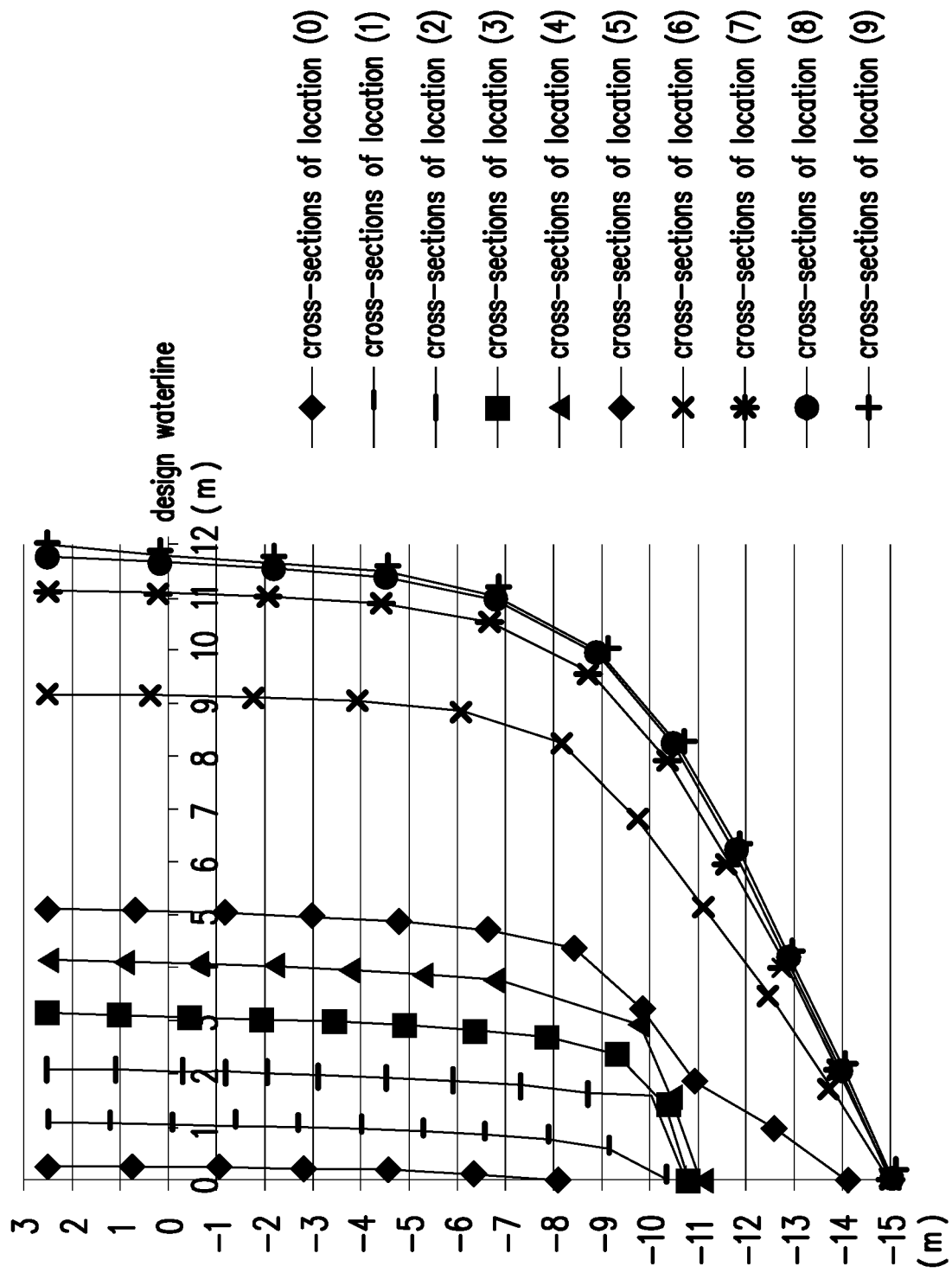
FIG. 3 is a partial body plan of multiple cross-sections of the hull of FIG. 2.

FIG. 2 is a partial side view of a hull of the wave sheltering vessel of FIG. 1. FIG. 3 is a partial body plan of multiple cross-sections of the hull of FIG. 2. Please refer to FIG. 1 to FIG. 3 simultaneously, in the embodiment, the wave sheltering vessel 100 includes a hull 110, a plurality of anchors 120 disposed at the hull 110 along a longitudinal direction, and a propeller system 130 disposed at the hull 110.

The length L of the hull 110 of the wave sheltering vessel 100 according to the embodiment is greater than or equal to 60 meters. The ratio of the length L to a design draft D is less than or equal to 6.5. The ratio of the length L to a breadth B is less than or equal to 3.5. The ratio of the breadth B to the design draft D is less than or equal to 2.3. Selectively, the design draft D is at least 11 meters. The respective dimensions of the wave sheltering vessel 100 according to the embodiment are exemplified using the following values: the length L is 80 meters, the breadth B is 24 meters, and the design draft D is 15 meters.

In the embodiment, the length L of the hull 110 may be designed to be smaller than or equal to 110 meters because the manufacturing cost of the hull increases as the length increases. However, the disclosure does not limit the upper limit of the length of the wave sheltering vessel.

In addition, in the embodiment, the number of the anchors 120 is three, and the anchors are respectively disposed at a bow 112, a stern 114, and a midship 116 of the hull 110. Of course, in other embodiments, the number and location of the anchors are not limited thereto.

For example, in an unillustrated embodiment, a wave sheltering vessel includes five anchors. The bow and the stern are respectively disposed with two opposite anchors, and the midship is disposed with one anchor. Also, the design of the bow and the stern facilitates anchoring from both sides of the vessel. Usually, anchoring is only required at the bow and the stern, and the anchor at the midship is used as a spare. In another unillustrated embodiment, the number of anchors may be six, wherein two anchors are correspondingly disposed port and starboard at the bow of the hull and two anchors are correspondingly disposed port and starboard at the stern of the hull, so as to facilitate anchoring from both sides of the vessel. Also, two anchors are correspondingly disposed port and starboard at the midship as spares.

It should be noted that the operation time of the jack-up vessel 10 is about 3 to 5 hours each time and the wave sheltering vessel 100 is required to shade the waves during this period. After the operation is completed, if the wave sheltering vessel 100 does not have its own propeller system, the wave sheltering vessel 100 must rely on towing by another vessel to be moved to another operation region. However, in the embodiment, the wave sheltering vessel 100 has the propeller system 130, so that the wave sheltering vessel 100 may move to the next operation region on its own without relying on another vessel.

Due to frequent movement requirement, in the embodiment, the hull 110 may be designed such that the bow 112 and the stern 114 are symmetrical. In other words, the wave sheltering vessel 100 of the embodiment may not only move in the direction of the bow 112, but also in the direction of the stern 114. Based on such configuration, the movement direction of the wave sheltering vessel 110 is unrestricted and has greater flexibility. Of course, in other embodiments, the bow and the stern of the hull do not have to be symmetrical, and disclosure is not limited herein.

Further, the anchors 120 of the wave sheltering vessel 100 according to the embodiment may adopt self-righting anchors. The self-righting anchors are easy to operate and can be risen and lowered within a short period of time, so as to facilitate movement of the wave sheltering vessel 100 according to the embodiment, thereby being able to assist the operation of wind power installation vessels at multiple places to fully utilize its function. Of course, in other embodiments, the type of the anchors may be changed according to actual requirements as long as the hull 110 can be fixed in the face of external forces such as currents, winds, and waves, and the disclosure is not limited herein.

The propeller system 130 of the embodiment includes, for example, two steerable propellers 132 respectively disposed below the bow 112 and the stern 114. In order to prevent increasing the size of the portion of the wave sheltering vessel 100 below the water surface, the bottom of the propellers 132 is designed, for example, to not exceed the bottom of the vessel. As such, the water depth requirement of the port can be reduced when the wave sheltering vessel 100 berthing at the port, thereby improving practicality of the wave sheltering vessel 100. The steerable propellers 132 may, for example, be rotated 360 degrees. The steerable propellers 132 not only provide the propulsion for the wave sheltering vessel 100 to move forward, backward, and sideways, but also assist in the anchoring operation when the wave sheltering vessel 100 needs to be moored at a point in the sea. Also, if necessary, the steerable propellers 132 can stabilize the wave sheltering vessel 100 together with the anchors 120 to withstand currents, winds, and waves. Of course, in other embodiments, the configuration location and number of the steerable propellers are not limited thereto.

Other embodiments are exemplified below for illustration. It should be noted that the following embodiments continue to use the reference numerals and some contents of the foregoing embodiments, wherein the same reference numerals are used to denote the same or similar elements and descriptions of the same technical content are omitted. In principle, different features of the respective embodiments may be applied to other embodiments. Regarding the descriptions of the omissions, references may be made to the foregoing embodiments and shall not be reiterated in the following embodiments.

Figure 4:
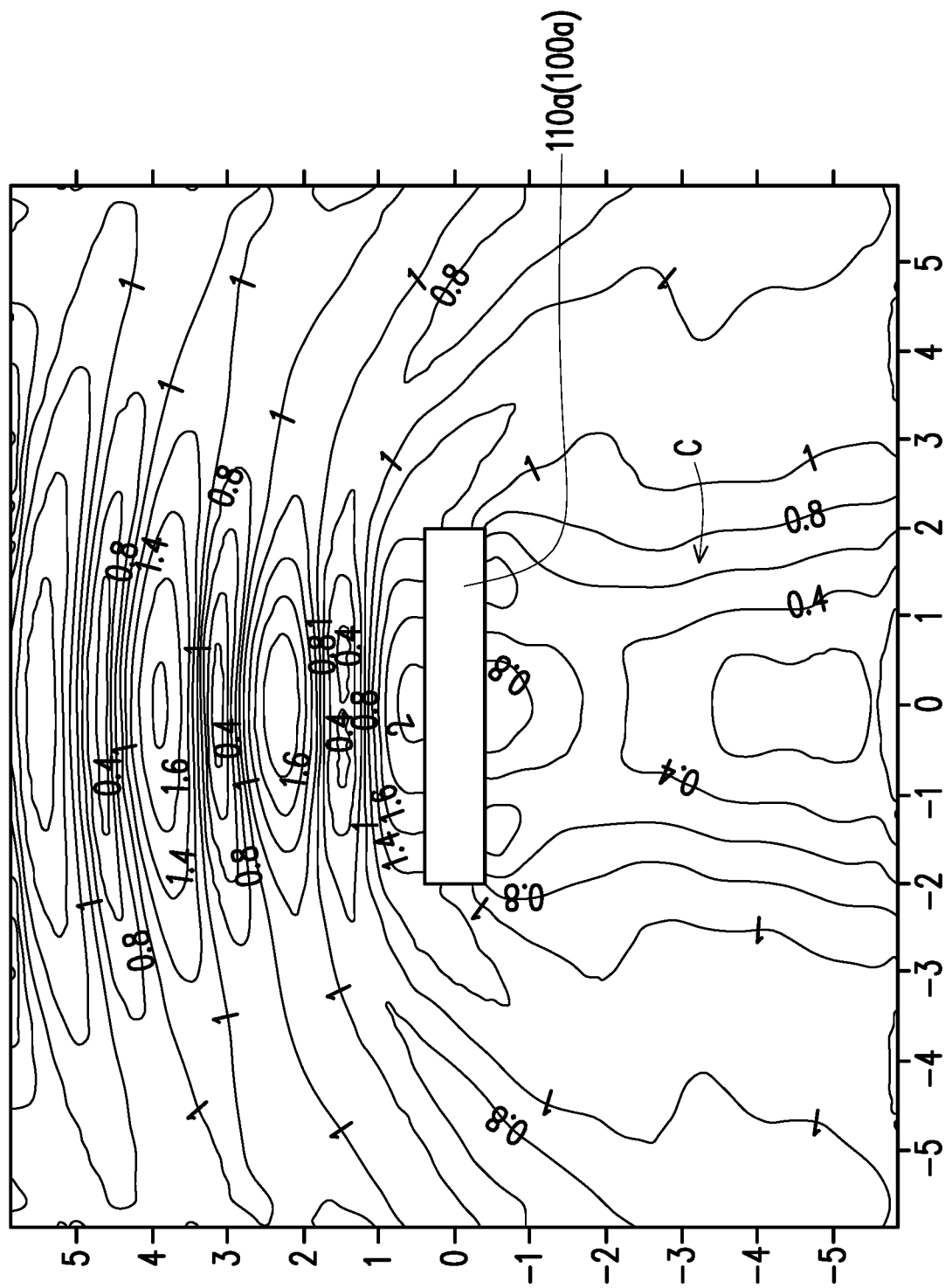
FIG. 4 is a wave contour diagram of a sheltering effect of a wave sheltering vessel in accordance with another embodiment of the disclosure.

FIG. 4 is a wave contour diagram of a sheltering effect of a wave sheltering vessel in accordance with another embodiment of the disclosure. Please refer to FIG. 4, it should be noted that in the embodiment, a length L of a hull 110a is 120 meters, a breadth B is 24 meters, a design draft is 15 meters, and the water depth is 30 meters. Also, the waves are incident directly downward from the top of the drawing and are sheltered by the hull 110a. FIG. 4 is presented in the form of a contour plot and the values in FIG. 4 represent the magnitude of the wave field. The values in FIG. 4 represent the values obtained after normalizing the wave heights at respective places with respect to the wave height of the incident wave. Therefore, FIG. 4 represents the magnitude distribution of the wave field around, at the upwave side, and at the lee side of the hull 110a after the waves are sheltered by the hull 110a. It can be observed from FIG. 4 that after the waves are sheltered by a wave sheltering vessel 100a, the wave sheltering vessel 100a of the embodiment is able to form a region C with smoother waves at the lee side (the bottom of FIG. 4) of the wave sheltering vessel 100a, which has a good sheltering effect.

The effect of principal dimensions of the wave sheltering vessels on the pitch RAO and the heave RAO of a jack-up vessel 10 will be investigated below to clearly demonstrate how the wave sheltering vessel 100 of the disclosure to reduce the wave height of waves at the lee side, thereby reducing the ship motion of the downstream installation vessel thereof.

Figure 5B:
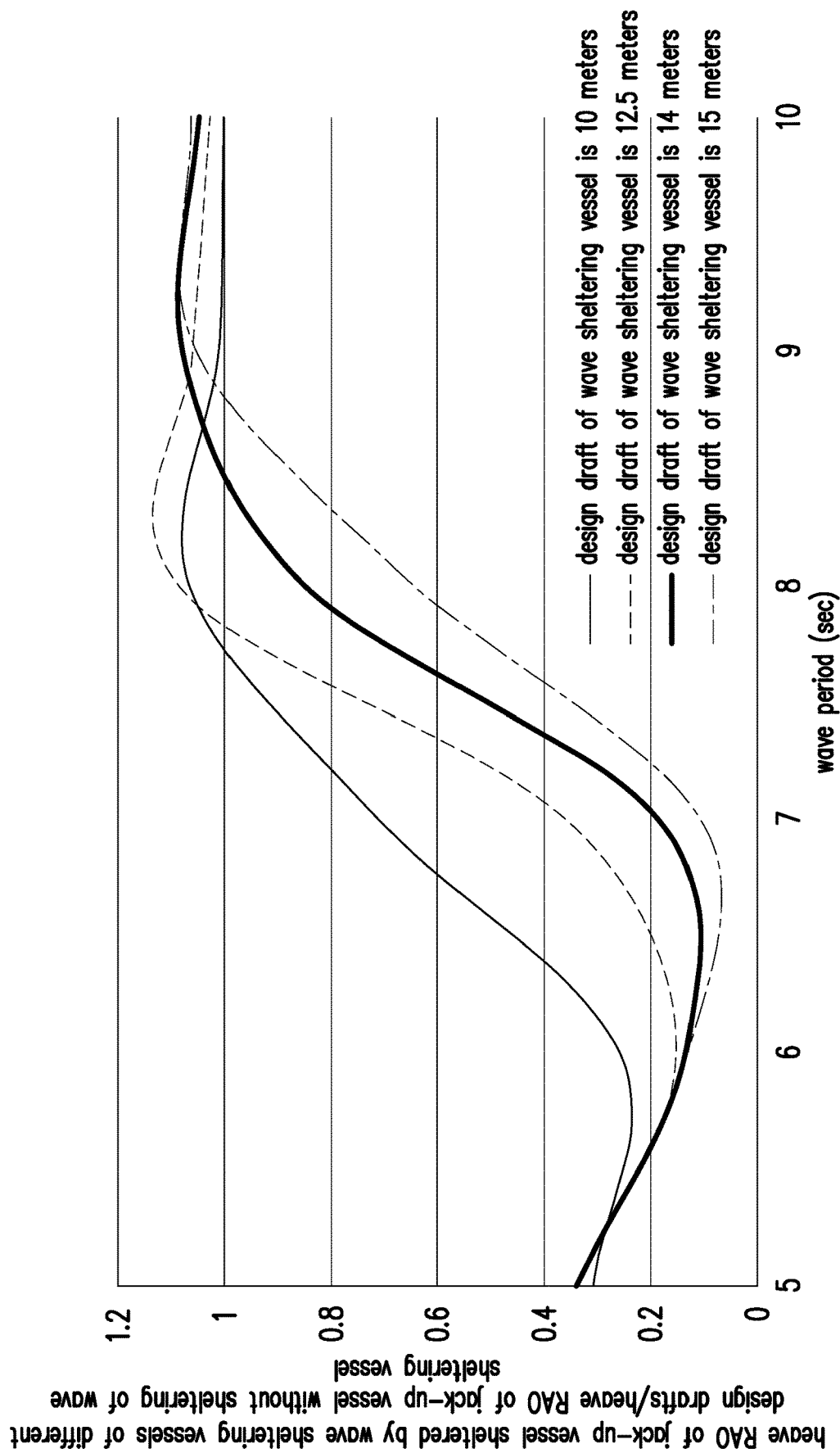
FIG. 5B is a diagram showing the up and down heave response of a jack-up vessel under sheltering effects of wave sheltering vessels of different design drafts at different incoming wave periods.

FIG. 5A is a diagram showing the pitch response of a jack-up vessel under sheltering effects of wave sheltering vessels of different design drafts at different incoming wave periods. FIG. 5B is a diagram showing the up and down heave response of a jack-up vessel under sheltering effects of wave sheltering vessels of different design drafts at different incoming wave periods. Further, FIG. 5A and FIG. 5B are in an environment where the water depth is 35 meters and the wave direction is 90 degrees, i.e. beam sea. In the embodiment, the length of the wave sheltering vessel is, for example, 80 meters, the breadth is, for example, 24 meters, and the design draft is, for example, 10 meters, 12.5 meters, 14 meters and 15 meters. The length of the jack-up vessel 10 is, for example, 60 meters, the breadth is, for example, 40 meters, and the design draft is, for example, 4 meters. Moreover, the side-to-side distance between the wave sheltering vessel and the jack-up installation vessel 10 is, for example, 60 meters. In addition, the pitch RAO and the heave RAO of the jack-up vessel 10 in FIG. 5A and FIG. 5B have both been divided by the pitch RAO and the heave RAO of the jack-up vessel 10 without sheltering of the wave sheltering vessel, that is, it has been normalized to facilitate clear comparison.

It can be observed from FIGS. 5A and 5B that the pitch RAO and the heave RAO of the jack-up vessel 10 are reduced when the design draft of the wave sheltering vessel becomes deeper. In detail, as shown in FIG. 5A and FIG. 5B, between the wave period of 5 to 8 seconds, the wave sheltering vessel with a design draft of 15 meters has significant wave sheltering effect as compared to the wave sheltering vessels with design drafts of 10 meters, 12.5 meters, and 14 meters. In addition, the wave sheltering vessel is applicable to a larger range of wave periods as the design draft thereof becomes deeper. In general, the sea condition of the wave period of between 5 and 8 seconds is the most common, so the operation period may be significantly increased by planning with respect to waves under such condition.

Therefore, it can be known from FIG. 5A and FIG. 5B that the deeper the design draft of the wave sheltering vessel, the better the effects of reducing the significant wave height of waves at the lee side of the wave sheltering vessel and the ship motion response of the vessel. In other words, the design draft of the wave sheltering vessel has a great influence on the wave sheltering effect of the wave sheltering vessel.

Figure 6A:
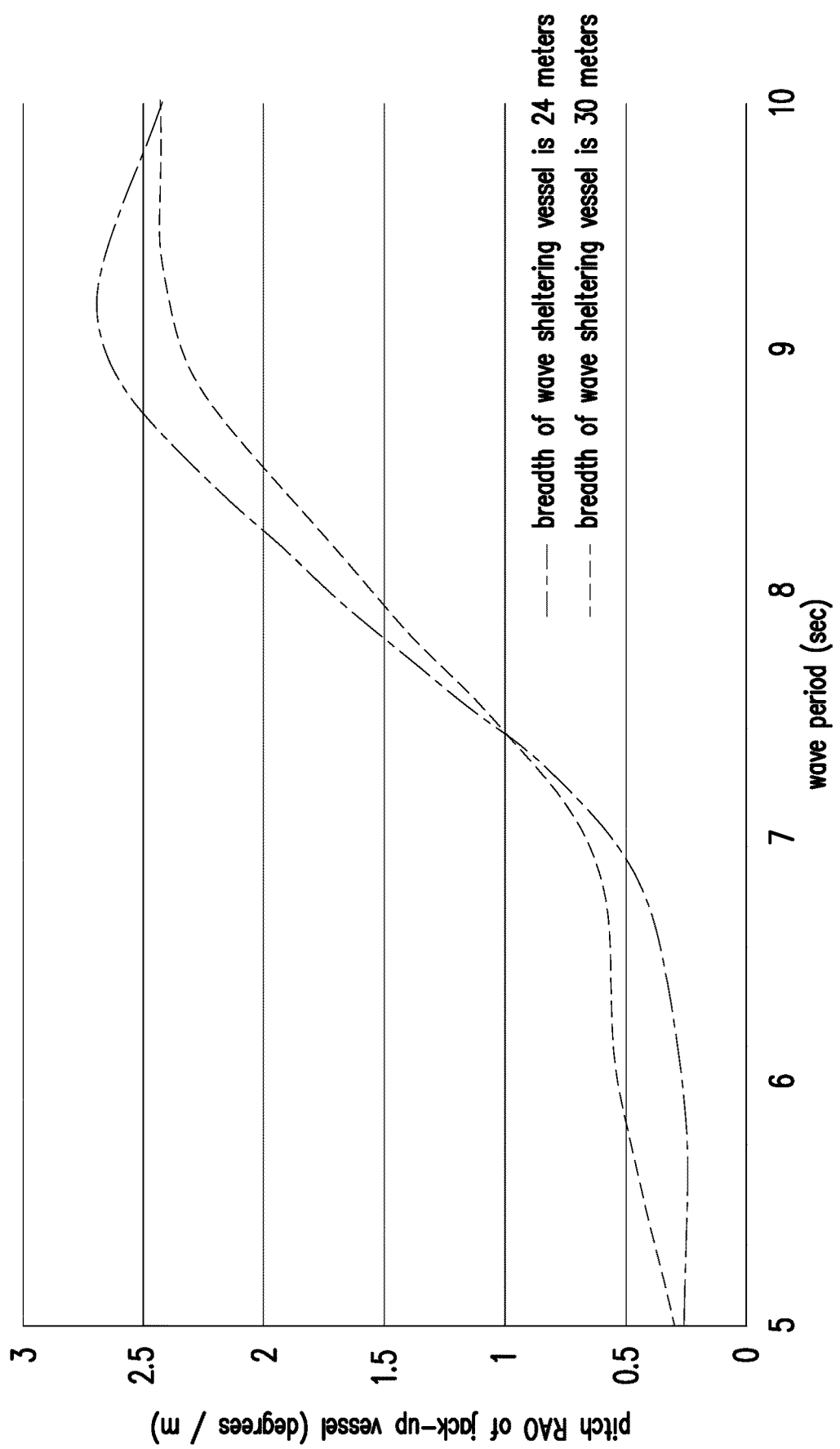
FIG. 6A is a diagram showing the pitch response of a jack-up vessel under sheltering effects of wave sheltering vessels of different breadths at different incoming wave periods.
Figure 6B:
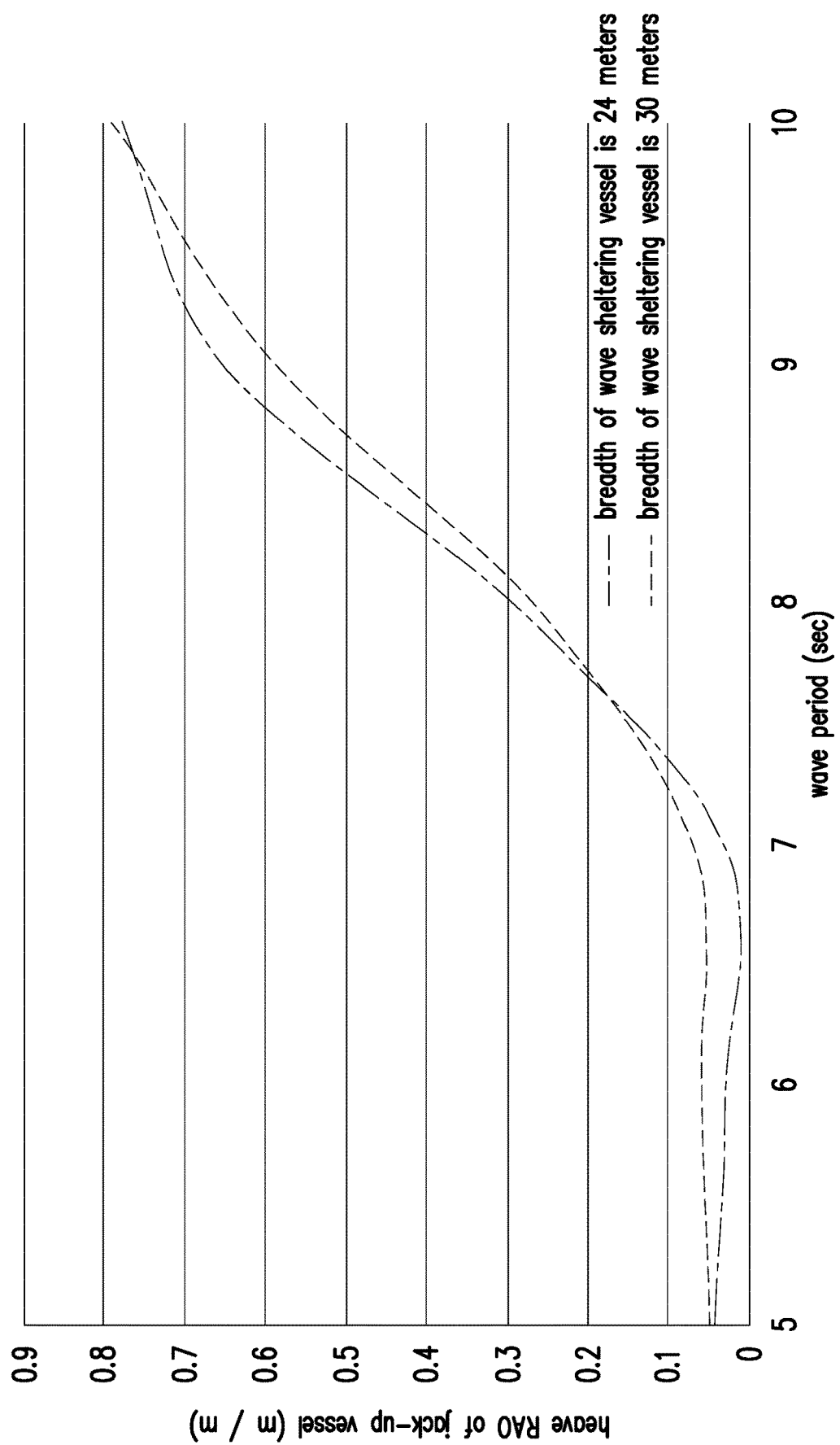
FIG. 6B is a diagram showing the up and down heave response of a jack-up vessel under sheltering effects of wave sheltering vessels of different breadths at different incoming wave periods.

FIG. 6A is a diagram showing the pitch response of a jack-up vessel under sheltering effects of wave sheltering vessels of different breadths at different incoming wave periods. FIG. 6B is a diagram showing the up and down heave response of a jack-up vessel under sheltering effects of wave sheltering vessels of different breadths at different incoming wave periods. Further, FIG. 6A and FIG. 6B are in an environment where the water depth is 35 meters and the wave direction is 90 degrees. In the embodiment, the length of the wave sheltering vessel is, for example, 80 meters, the breadth is, for example, 24 meters and 30 meters, and the design draft is, for example, 15 meters. The length of a jack-up vessel 10 is, for example, 60 meters, the breadth is, for example, 40 meters, and the design draft is, for example, 4 meters. Moreover, the side-to-side distance between the wave sheltering vessel and the jack-up vessel 10 is, for example, 60 meters. Referring to FIG. 6A and FIG. 6B, regardless of whether the breadth of the wave sheltering vessel is 24 meters or 30 meters, the influence on the pitch RAO and the heave RAO of the jack-up vessel 10 is not large. In other words, the breadth of the wave sheltering vessel is not the main factor which may effectively reduce the wave height of waves.

It should be noted that the location of offshore wind farm is normally around 50 kilometers away from the homeport. It takes around 3 hours for the installation staff to transport back and forth between the homeport and the workplace. The transportation process is neither comfortable nor efficient. In the embodiment, the wave sheltering vessel 100 is not only used to shade the waves to reduce the wave height of waves, but also configured with a plurality of cabins 20 (as shown in FIG. 1) for providing accommodation to the installation staff or to store spare parts and consumables, which not only improves work efficiency but also saves transportation costs. In terms of the number of cabins 20, which includes, for example, 50 cabins for accommodation for general staff working in the wind farm and 10 cabins for staff of the wave sheltering vessel 100.

Of course, in other embodiments, the form and number of the cabin may also be adjusted according to actual requirements. For example, the cabins may also be operated as a sea hotel to increase the source of income, and disclosure is not limited herein. Therefore, in order to improve the comfort of the accommodating staff, the pitch RAO and the heave RAO of the hull 110 of the wave sheltering vessel 100 should be relatively small.

In addition, please refer back to FIG. 2 and FIG. 3. It should be noted that if a hull with a relatively flat bottom is used as the hull of the wave sheltering vessel, when the wave sheltering vessel encounters waves, the up and down heave movement of the hull will be increased. However, the deeper the ship's draft, the smaller the wave effect. Moreover, the up and down heave of the wave sheltering vessel also causes discomfort to the accommodating staff in the vessel. Therefore, the wave sheltering effect of the wave sheltering vessel 100 and the comfort of the accommodating staff in the vessel may be simultaneously taken care of. In addition, accommodation is normally required during non-working period at night. At this time, in order to reduce the ship motion of the wave sheltering vessel, so as to improve the comfort of the accommodating staff, the wave sheltering vessel is rotated to align with the direction of the waves, that is, the angle between the longitudinal direction of the vessel length L and the direction of the incoming waves is between 0 and 30 degrees, i.e. at head sea. Therefore, under the state where the design draft D must be maintained at a specific depth, as shown in FIG. 2, the hull 110 of the wave sheltering vessel 100 according to the embodiment not only has a relatively large deadrise angle but also has a deep draft comparing to the normal vessel. Based on such design, the ship motion of the hull 110 is ensured to be limited when the wave sheltering vessel 100 encounter head sea, i.e. the wind and waves come from the bow of the wave sheltering vessel 100.

The effects of hulls under different draft on the pitch RAO and the heave RAO of the wave sheltering vessel will be investigated below.

Figure 7A:
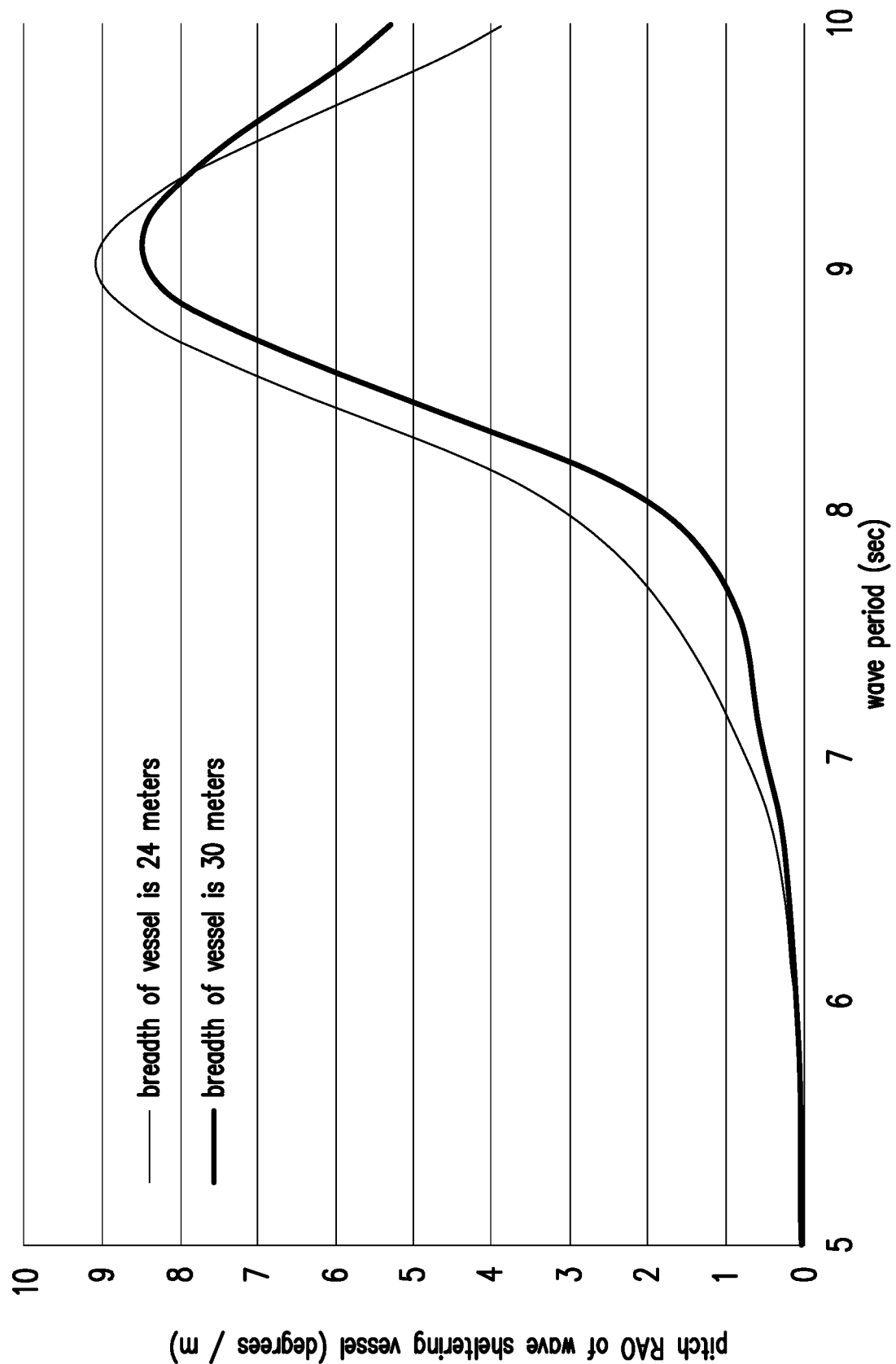
FIG. 7A is a diagram showing the pitch response of wave sheltering vessels of different breadths at different incoming wave periods at a water depth of 35 meters and a wave direction of 0 degrees.
Figure 7B:
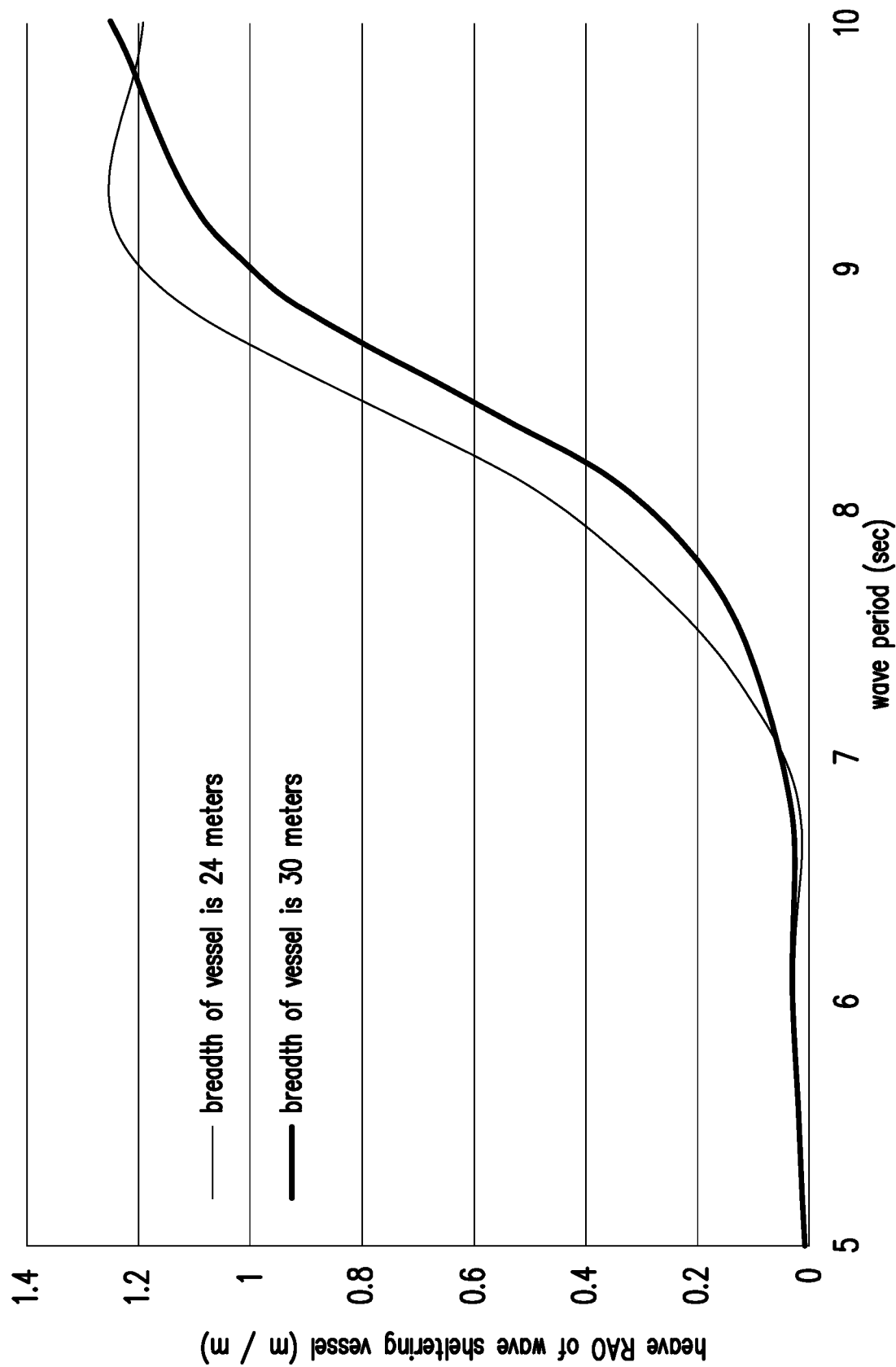
FIG. 7B is a diagram showing the up and down heave response of wave sheltering vessels of different breadths at different incoming wave periods at a water depth of 35 meters and a wave direction of 0 degrees.
Figure 8A:
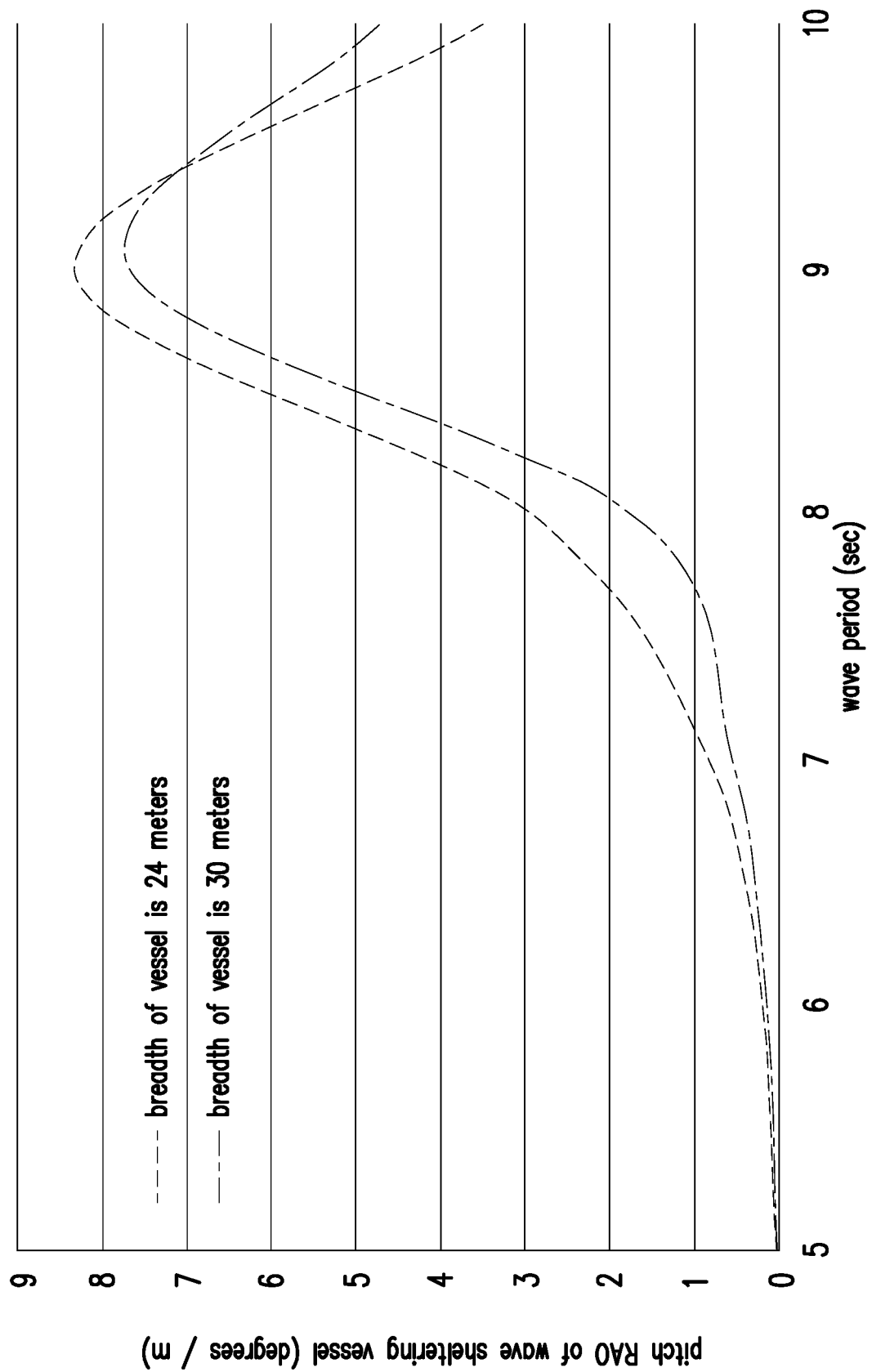
FIG. 8A is a diagram showing the pitch response of wave sheltering vessels of different breadths at different incoming wave periods at a water depth of 35 meters and a wave direction of 30 degrees.
Figure 8B:
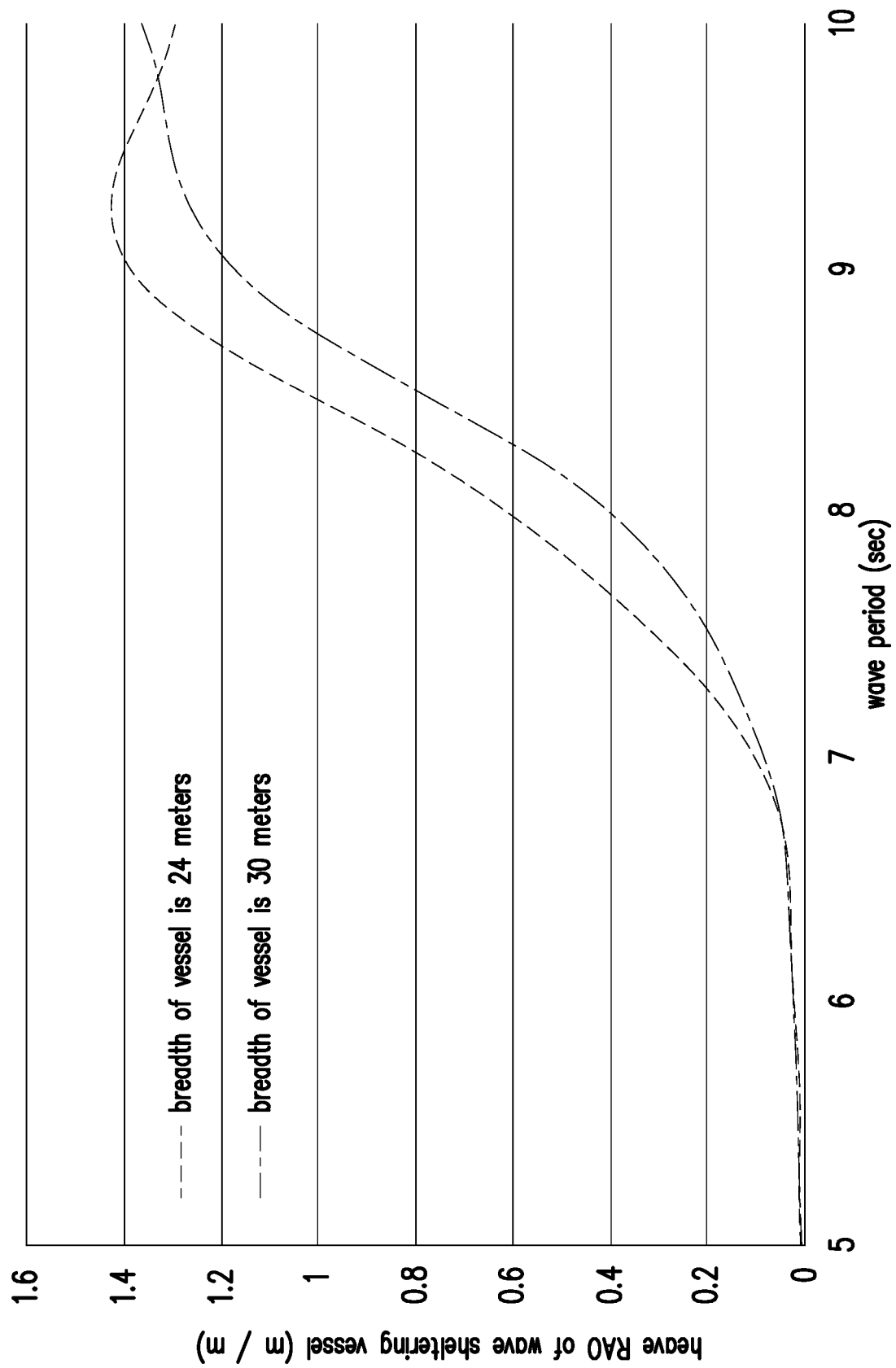
FIG. 8B is a diagram showing the up and down heave response of wave sheltering vessels of different breadths at different incoming wave periods at a water depth of 35 meters and a wave direction of 30 degrees.

FIG. 7A is a diagram showing the pitch response of wave sheltering vessels of different breadths at different incoming wave periods at a water depth of 35 meters and a wave direction of 0 degrees. FIG. 7B is a diagram showing the up and down heave response of wave sheltering vessels of different breadths at different incoming wave periods at a water depth of 35 meters and a wave direction of 0 degrees. FIG. 8A is a diagram showing the pitch response of wave sheltering vessels of different breadths at different incoming wave periods at a water depth of 35 meters and a wave direction of 30 degrees. FIG. 8B is a diagram showing the up and down heave response of wave sheltering vessels of different breadths at different incoming wave periods at a water depth of 35 meters and a wave direction of 30 degrees. Referring to FIG. 7A, FIG. 7B, FIG. 8A, and FIG. 8B, the effects of the breadth of the wave sheltering vessel on the pitch RAO and the heave RAO of the hull of the wave sheltering vessel is insignificant regardless whether the sea condition has a wave direction of 0 degrees or 30 degrees.

Figure 9A:
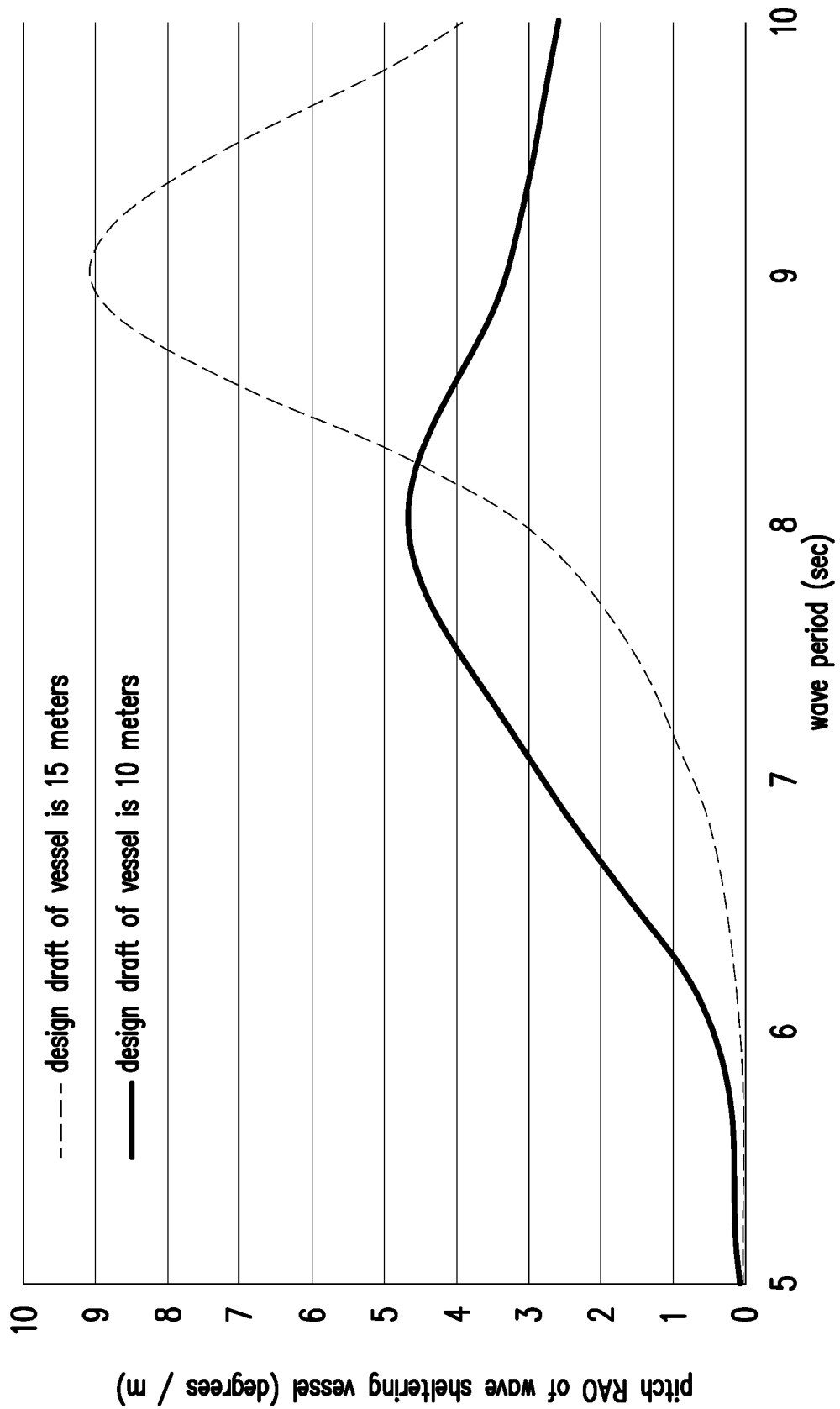
FIG. 9A is a diagram showing the pitch response of wave sheltering vessels of different design drafts at different incoming wave periods at a wave direction of 0 degrees.
Figure 9B:
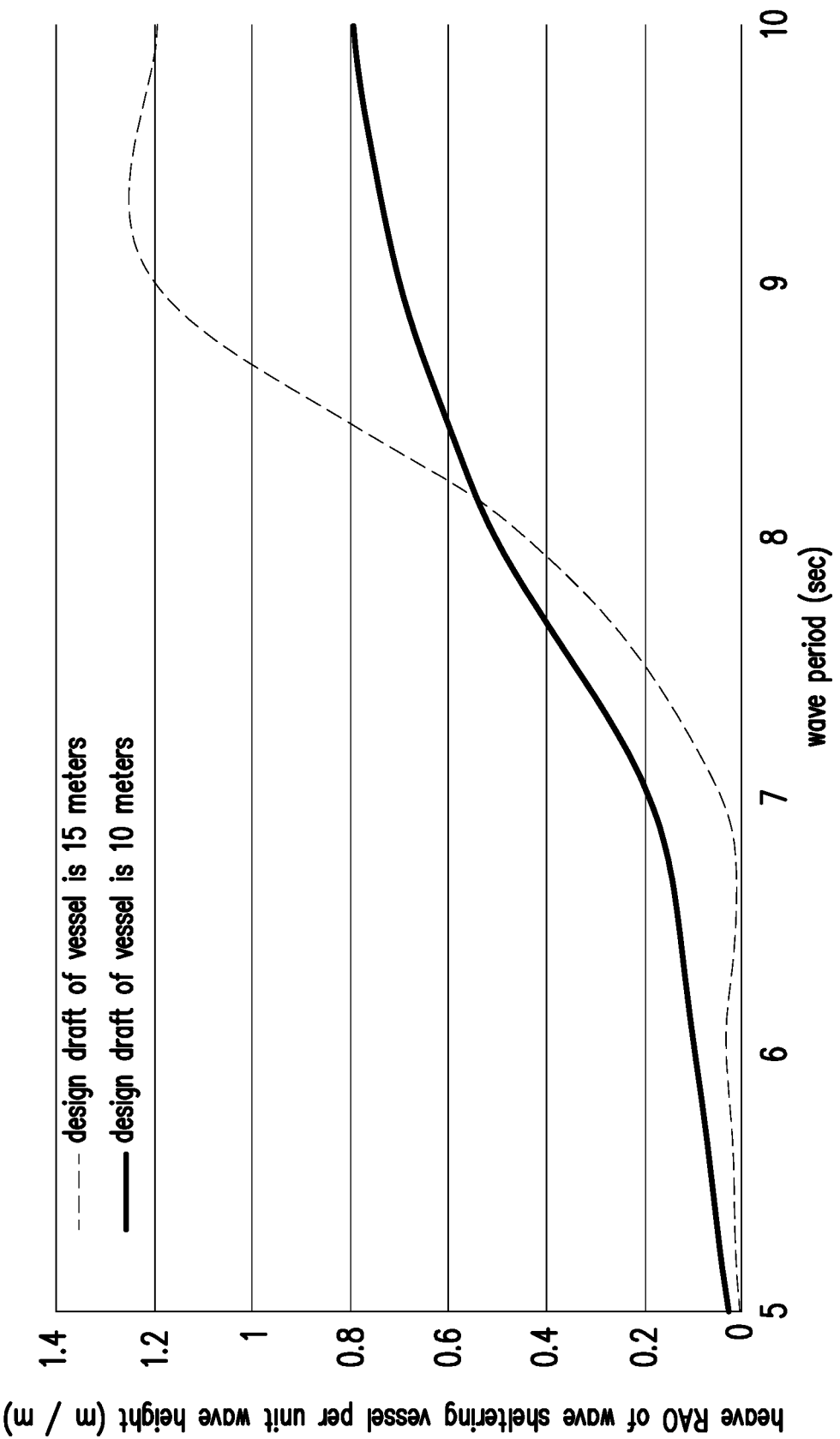
FIG. 9B is a diagram showing the up and down heave response of wave sheltering vessels of different design drafts at different incoming wave periods at a wave direction of 0 degrees.
Figure 10A:
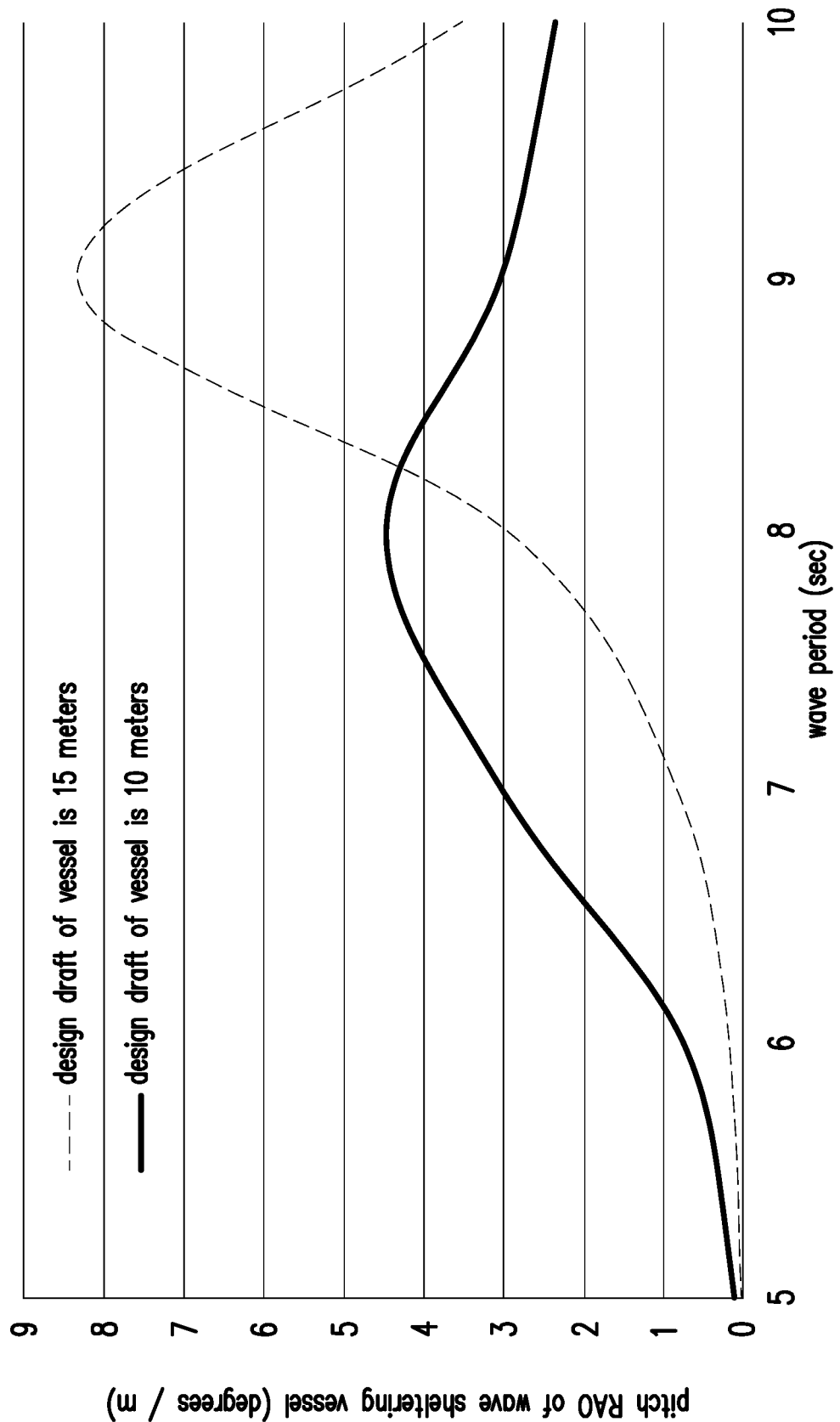
FIG. 10A is a diagram showing the pitch response of wave sheltering vessels of different design drafts at different incoming wave periods at a wave direction of 30 degrees.

The design drafts of wave sheltering vessels as the variable will be compared as below. FIG. 9A is a diagram showing the pitch response of wave sheltering vessels of different design drafts at different incoming wave periods at a wave direction of 0 degrees. FIG. 9B is a diagram showing the up and down heave response of wave sheltering vessels of different design drafts at different incoming wave periods at a wave direction of 0 degrees. FIG. 10A is a diagram showing the pitch response of wave sheltering vessels of different design drafts at different incoming wave periods at a wave direction of 30 degrees. FIG. 10B is a diagram showing the up and down heave response of wave sheltering vessels of different design drafts at different incoming wave periods at a wave direction of 30 degrees. Therefore, it can be clearly known from FIG. 9A, FIG. 9B, FIG. 10A, and FIG. 10B that when the wave period is between 5 seconds and 8 seconds, the pitch RAO and the heave RAO of the wave sheltering vessel with a design draft of 15 meters is significantly smaller than that of the wave sheltering vessel with a design draft of 10 meters, regardless of whether the sea condition has a wave direction of 0 degrees or 30 degrees. Therefore, it can be inferred that the wave sheltering vessel with a design draft of 15 meters is more comfortable for the staff in the vessel as compared to the wave sheltering vessel with a design draft of 10 meters, if the deeper the design draft, the higher the comfortability. Since the normal service operation vessel (SOV) which serve as an accommodation for wind farm has draft only 5 meters, the wave sheltering vessel of the present application obviously has much better comfortability than that of the SOV.

Figure 11A:
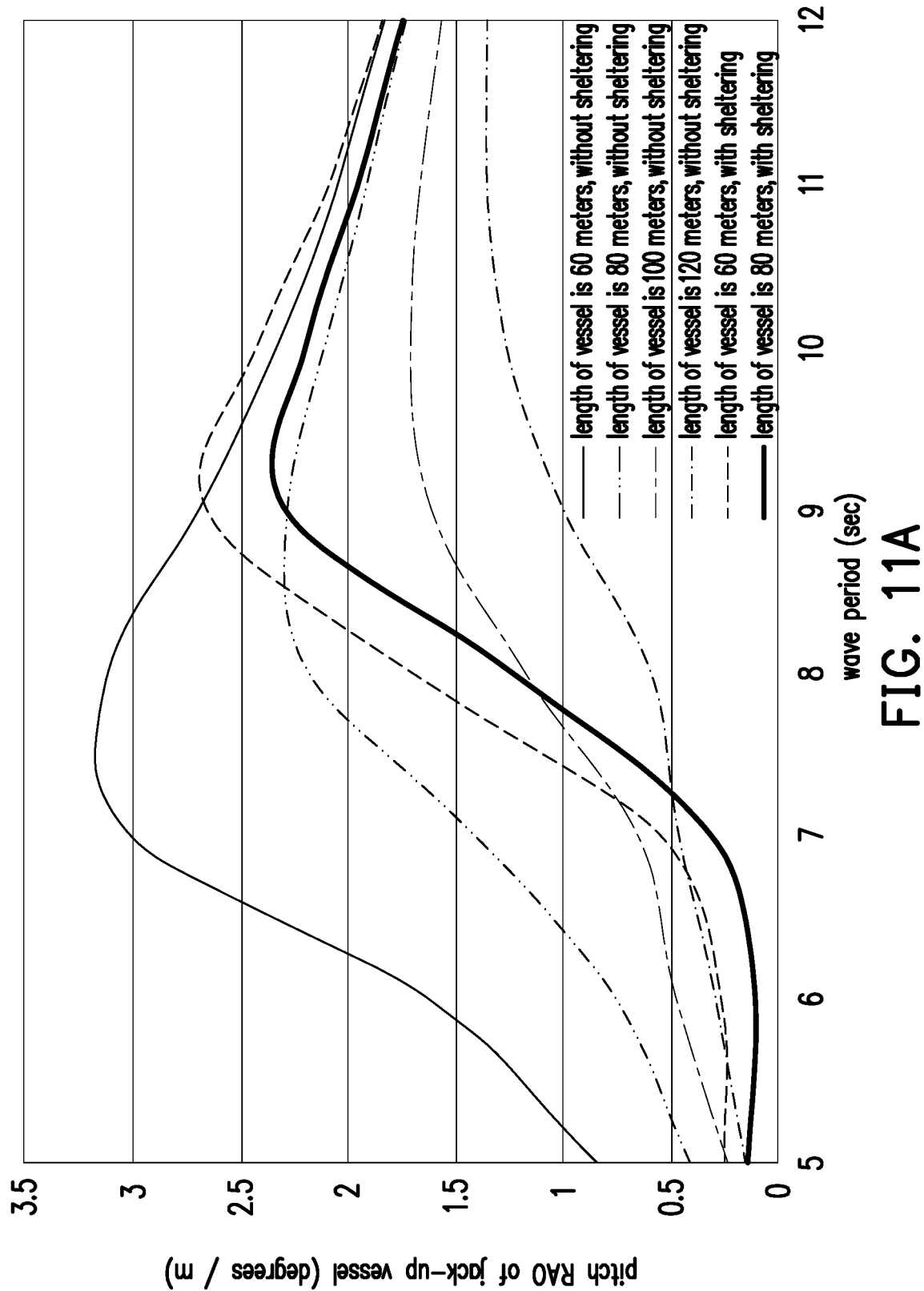
FIG. 11A is a diagram showing the pitch response of jack-up vessels of different lengths while with or without being sheltered by the wave sheltering vessels at different incoming wave periods.

FIG. 11A is a diagram showing the pitch response of jack-up vessels of different lengths while with or without being sheltered by the wave sheltering vessels at different incoming wave periods. Please refer to FIG. 11A, here, the water depth is set to 35 meters and the wave direction is 90 degrees. That is, the wave impacts the hull from the lateral direction perpendicular to the length of the vessel. As shown in FIG. 11A, for the jack-up vessels of 60, 80, 100 and 120 meters without being sheltered by the wave sheltering vessels, the pitch RAO of the jack-up vessels will be decreased while the length of the jack-up vessel is longer. Although it can be seen that the increase of the length of the jack-up vessel is a solution that can alleviate the inability to construct due to severe vessel motion response, the increase of the length is accompanied by a substantial increase in the construction cost of the jack-up vessel. As shown in FIG. 11A, in the normal working environment of the jack-up vessel, that is, when the wave period is between 6 and 7 seconds, the pitch RAO of the jack-up vessel with a length of 60 meters sheltered by the wave sheltering vessel with a design draft of 15 meters is already less than the pitch RAO of the jack-up vessel with a length of 100 meters which is not sheltered by the wave sheltering vessel, and the pitch RAO of the jack-up vessel with a length of 80 meters sheltered by the wave sheltering vessel with a design draft of 15 meters is already less than the pitch RAO of the jack-up vessel with a length of 120 meters which is not sheltered by the wave sheltering vessel. In other words, as long as the wave sheltering vessel of the embodiment of the present invention is applied to provide sheltering, the pitch RAO of the jack-up vessel can be greatly reduced without increasing the cost to increase the length of the jack-up vessel. The wave sheltering vessel of the embodiment is the most economical solution for extending the number of working days of the jack-up vessel.

Figure 11B:
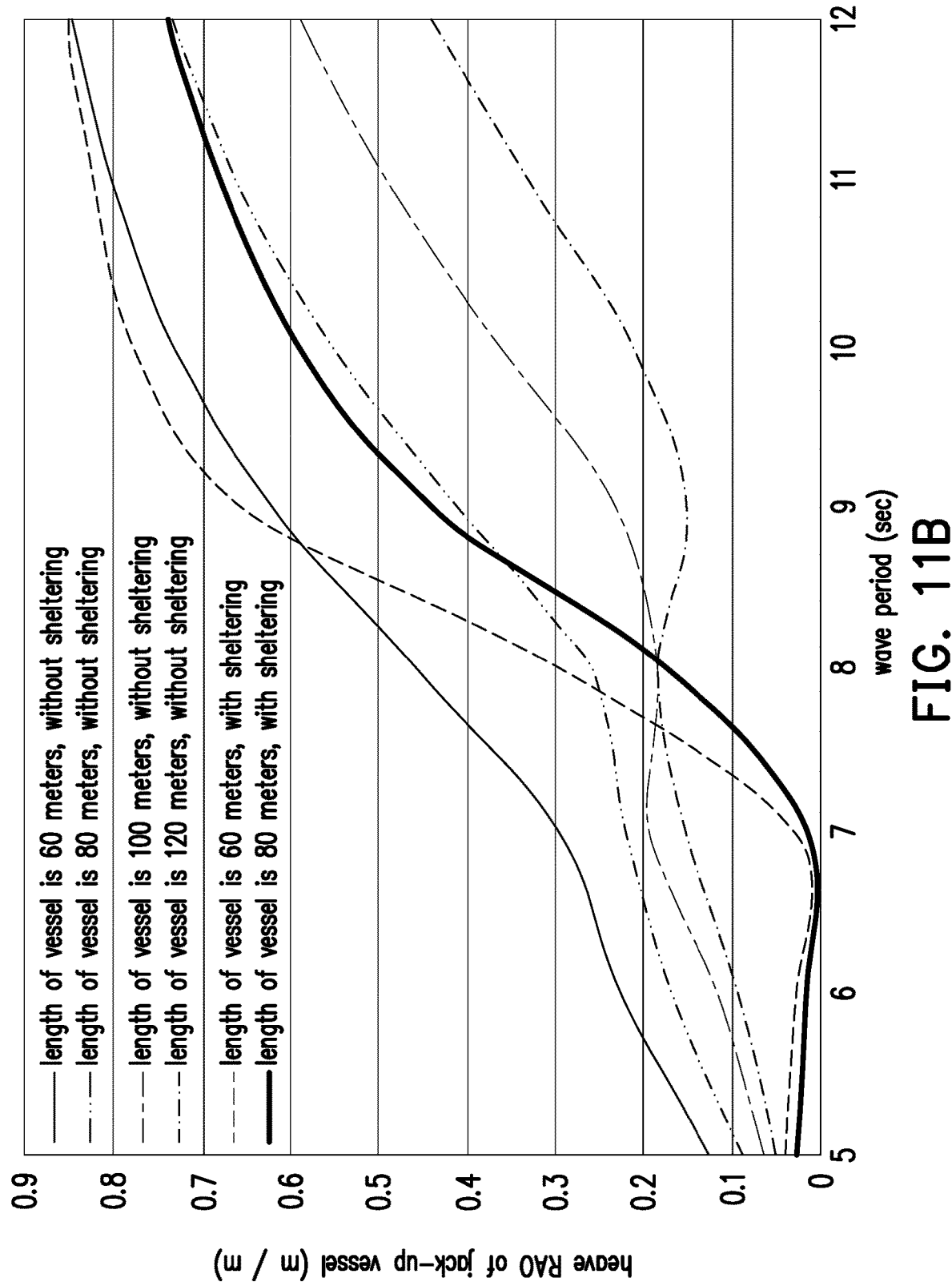
FIG. 11B is a diagram showing the up and down heave response of jack-up vessels of different lengths while with or without being sheltered by the wave sheltering vessels at different incoming wave periods.

FIG. 11B is a diagram showing the up and down heave response of jack-up vessels of different lengths while with or without being sheltered by the wave sheltering vessels at different incoming wave periods. Please refer to FIG. 11B, here, the water depth is set to 35 meters and the wave direction is 90 degrees. That is, the wave impacts the hull from the lateral direction perpendicular to the length of the vessel. As shown in FIG. 11B, in the normal working environment of the jack-up vessel, that is, when the wave period is between 6 and 7 seconds, the heave RAO of the jack-up vessels of lengths of 60 and 80 meters sheltered by the wave sheltering vessel with a design draft of 15 meters is much less than the heave RAO of the jack-up vessels with lengths of 60, 80, 100 and 120 meters which are not sheltered by the wave sheltering vessel. In other words, as long as the wave sheltering vessel of the embodiment of the present invention is applied to provide sheltering, the heave RAO of the jack-up vessel can be greatly reduced.

Figure 12A:
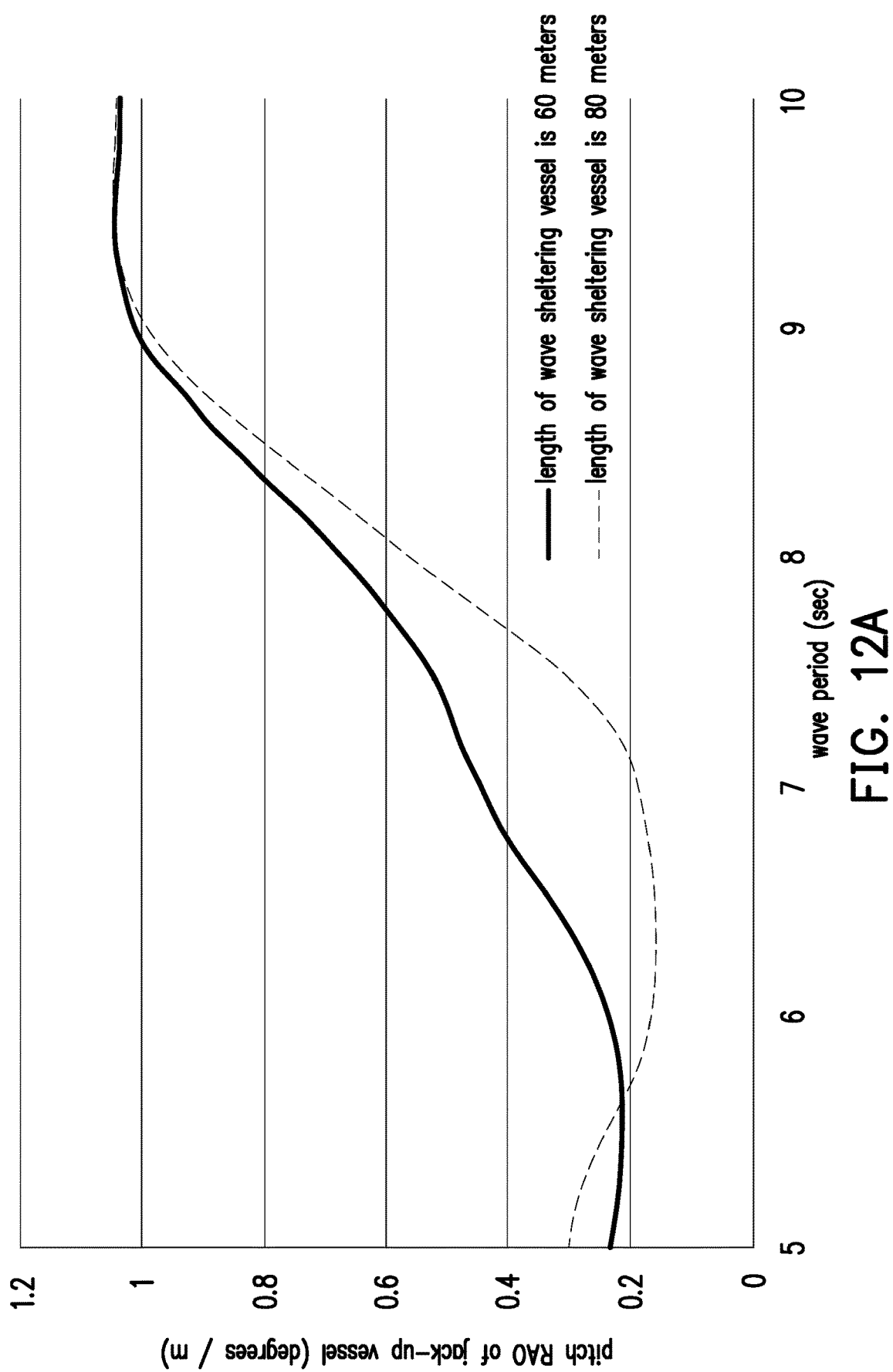
FIG. 12A is a diagram showing the pitch response of jack-up vessels with being sheltered by the wave sheltering vessels of different lengths at different incoming wave periods.

FIG. 12A is a diagram showing the pitch response of jack-up vessels with being sheltered by the wave sheltering vessels of different lengths at different incoming wave periods. Please refer to FIG. 12A, here, the water depth is set to 35 meters and the wave direction is 90 degrees. That is, the wave impacts the hull from the lateral direction perpendicular to the length of the vessel. As shown in FIG. 12A, in the normal working environment of the jack-up vessel, that is, when the wave period is between 6 and 7 seconds, the pitch RAO of the jack-up vessel sheltered by the wave sheltering vessel with a design draft of 15 meters and a length of 80 meters is less than the pitch RAO of the jack-up vessel sheltered by the wave sheltering vessel with a design draft of 15 meters and a length of 60 meters. In other words, when the length of the wave sheltering vessel of the embodiment of the present invention is longer, a better effect is obtained for the reduction of the pitch RAO of the jack-up vessel.

Figure 12B:
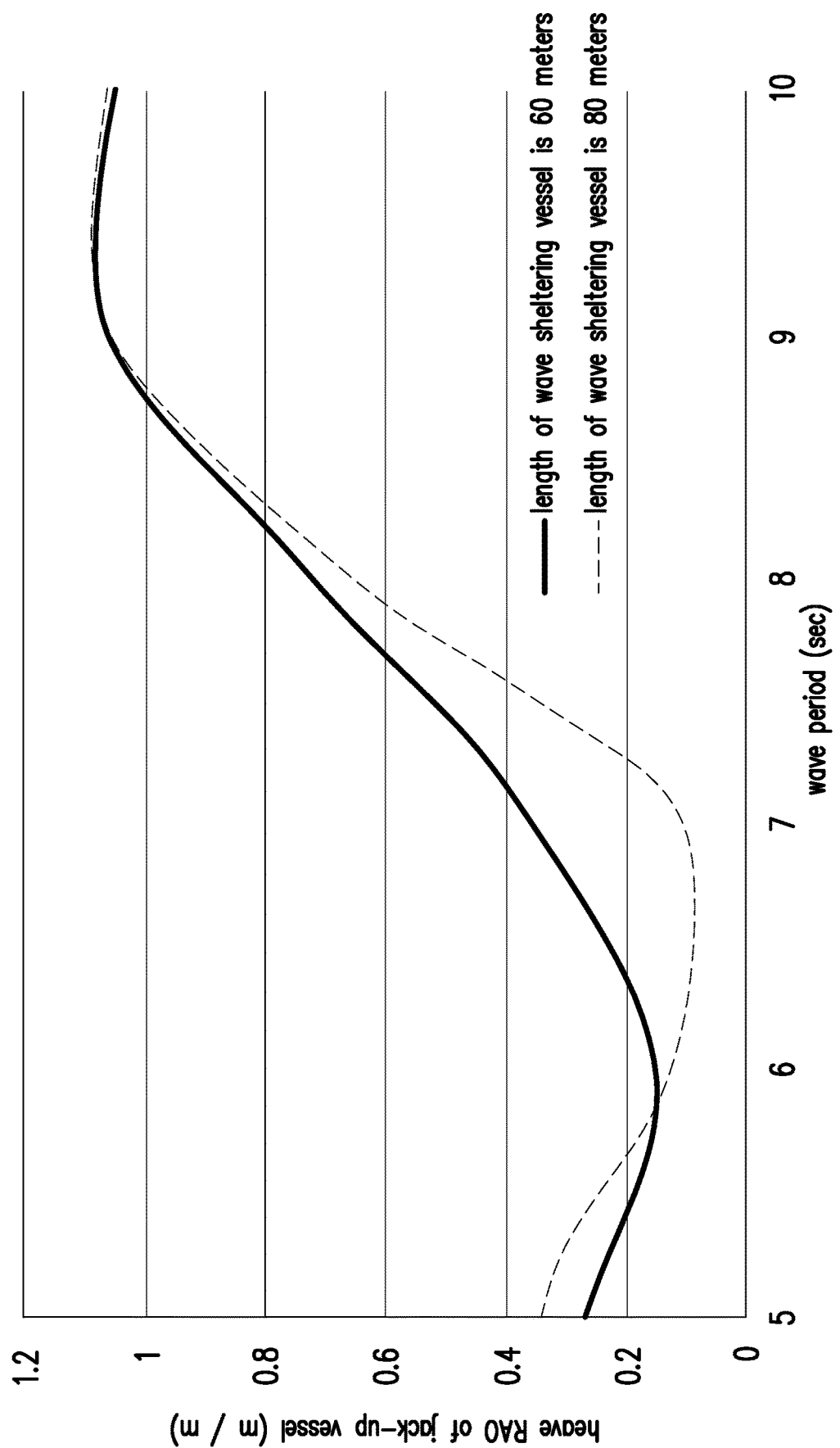
FIG. 12B is a diagram showing the up and down heave response of jack-up vessels with being sheltered by the wave sheltering vessels of different lengths at different incoming wave periods.

FIG. 12B is a diagram showing the up and down heave response of jack-up vessels with being sheltered by the wave sheltering vessels of different lengths at different incoming wave periods. Please refer to FIG. 12B, here, the water depth is set to 35 meters and the wave direction is 90 degrees. That is, the wave impacts the hull from the lateral direction perpendicular to the length of the vessel. As shown in FIG. 12B, in the normal working environment of the jack-up vessel, that is, when the wave period is between 6 and 7 seconds, the heave RAO of the jack-up vessel sheltered by the wave sheltering vessel with a design draft of 15 meters and a length of 80 meters is less than the heave RAO of the jack-up vessel sheltered by the wave sheltering vessel with a design draft of 15 meters and a length of 60 meters. In other words, when the length of the wave sheltering vessel of the embodiment of the present invention is longer, a better effect is obtained for the reduction of the heave RAO of the jack-up vessel. As can be seen from FIGS. 12A and 12B, the wave sheltering effect of a wave sheltering vessel with a length of 80 meters is better than that of the wave sheltering vessel with a length of 60 meters, but even the wave sheltering vessel with a length of 60 meters still has a good wave sheltering effect. This is very important for the maintenance of offshore wind farm in the future, because the maintenance vessel will be much smaller than the jack-up vessel for the installation, so the length of the corresponding wave sheltering vessel with a length of 60 meters will be enough.

Based on the above, in the wave sheltering vessel of the disclosure, a specific ratio exists between the length, the breadth, and the design draft of the vessel, and the anchors and the propeller system are disposed, which not only effectively reduces the wave height of waves at the lee side of the wave sheltering vessel, but also facilitates movement. The design draft of the wave sheltering vessel of the disclosure is far greater than that of a common vessel, so it has a good wave sheltering effect and is also suitable for the accommodation for the operating staff. The wave sheltering vessel of the disclosure may not only shade the waves such that the wind turbine installation vessel may smoothly operate at the lee side of the wave sheltering vessel, but may also be selectively configured with a large number of cabins to provide accommodation for the operating staff, to store spare parts and consumables, and even to be developed into a sea hotel. As such, not only is the expenditure on transportation back and forth from the homeport saved, but additional income is also increased. Furthermore, although the foregoing embodiments are all exemplified with the wave sheltering vessel providing an environment suitable for the wind power installation vessel to operate, the area with a relatively calm sea condition as provided by the wave sheltering vessel of the disclosure may certainly also contribute to other offshore projects and activities. For example, during the maintenance of the offshore wind farm, engineers are strictly affected by the waves when they are going to board the tower from the crew transportation vessel (CTV), and the jack-up vessel is strictly affected by the waves when the heavy part is needed to be lift down from the fan tower by the jack-up vessel. The wave sheltering vessels will also greatly improve the working environment. The disclosure is not limited herein.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wave sheltering vessel, used to reduce significant wave height of waves, comprising:
   a single hull having a length of greater than or equal to 60 meters and less than or equal to 110 meters, wherein a ratio of the length to a design draft of the single hull is less than or equal to 6.5, a ratio of the length to a breadth of the single hull is less than or equal to 3.5, and a ratio of the breadth to the design draft of the single hull is less than or equal to 2.3;

a plurality of anchors installed at the single hull along a longitudinal direction of the single hull; and a propeller system disposed at the single hull, wherein the propeller system comprises two steerable propellers respectively disposed at a bow and a stern of the single hull, wherein a bottom of the propellers does not exceed a bottom of the wave sheltering vessel.

2. The wave sheltering vessel according to claim 1, wherein a number of the plurality of anchors is five and the plurality of anchors are respectively disposed at a bow, a stern, and a midship of the single hull.

3. The wave sheltering vessel according to claim 1, wherein the plurality of steerable propellers can be rotated by 360 degrees.

4. The wave sheltering vessel according to claim 1, wherein the design draft of the single hull is at least 11 meters.

5. The wave sheltering vessel according to claim 1, wherein the single hull has a plurality of cabins.

6. The wave sheltering vessel according to claim 1, wherein the plurality of anchors is self-righting anchors.

* * * * *